(12) United States Patent
Iseda

(10) Patent No.: US 8,204,040 B2
(45) Date of Patent: Jun. 19, 2012

(54) WIRELESS COMMUNICATIONS METHOD, WIRELESS CONTROL STATION, AND WIRELESS BASE STATION

(75) Inventor: Kohei Iseda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 455 days.

(21) Appl. No.: 12/482,765

(22) Filed: Jun. 11, 2009

(65) Prior Publication Data

US 2009/0245196 A1 Oct. 1, 2009

Related U.S. Application Data

(63) Continuation of application No. PCT/JP2006/325952, filed on Dec. 26, 2006.

(51) Int. Cl.
*H04L 12/28* (2006.01)
(52) U.S. Cl. ........................................ 370/351
(58) Field of Classification Search ................. None
See application file for complete search history.

(56) References Cited

U.S. PATENT DOCUMENTS

| | | | |
|---|---|---|---|
| 6,185,504 B1 * | 2/2001 | Berstis et al. | 701/482 |
| 6,477,382 B1 * | 11/2002 | Mansfield et al. | 455/458 |
| 6,542,494 B1 | 4/2003 | Sugaya et al. | |
| 6,608,824 B1 | 8/2003 | Sugaya | |
| 6,745,049 B1 * | 6/2004 | Uchida et al. | 455/560 |
| 7,298,733 B2 * | 11/2007 | Sakai et al. | 370/352 |
| 7,664,030 B2 * | 2/2010 | Sugaya | 370/235 |
| 7,873,002 B2 * | 1/2011 | Cai | 370/329 |
| 2004/0127223 A1 * | 7/2004 | Li et al. | 455/446 |
| 2004/0147254 A1 * | 7/2004 | Reddy et al. | 455/422.1 |
| 2005/0169237 A1 * | 8/2005 | Mirbaha et al. | 370/351 |
| 2006/0046643 A1 | 3/2006 | Izumikawa et al. | |
| 2006/0264172 A1 | 11/2006 | Izumikawa et al. | |
| 2007/0038751 A1 * | 2/2007 | Jorgensen | 709/226 |

FOREIGN PATENT DOCUMENTS

| | | |
|---|---|---|
| JP | 200092076 A | 3/2000 |
| JP | 2000151641 A | 5/2000 |
| JP | 2001077737 A | 3/2001 |
| JP | 200674325 | 3/2006 |
| JP | 2006129194 | 5/2006 |
| JP | 2006295778 | 10/2006 |
| WO | 2008044318 | 4/2008 |

OTHER PUBLICATIONS

International Search Report dated Apr. 10, 2007.
"IEEE Std 802.16/2004 IEEE Standard for Local and Metropolitan Area Networks Part 16: Air Interface for Fixed Broadband Wireless Access Systems" IEEE Computer Society and the IEEE Microwave Theory and Techniques Society; Oct. 1, 2004.
"IEEE Std 802.16e-2005 IEEE Standard for Local and Metropolitan Area Networks Part 16: Air Interface for Fixed and Mobile Broadband Wireless Access Systems" IEEE Computer Society and the IEEE Microwave Theory and Techniques Society; Feb. 28, 2006.
Decision of Rejection dated Aug. 23, 2011 relation to Japanese Patent Application No. 2008-550953.

* cited by examiner

*Primary Examiner* — Chi Pham
*Assistant Examiner* — Fan Ng
(74) *Attorney, Agent, or Firm* — Fujitsu Patent Center

(57) ABSTRACT

The present invention relates to a wireless communications method, a wireless control station, and a wireless base station. One of the objects of the present invention is to make it possible to allocate the wireless resources to more than one road side device without interference thereamong. Therefore, the allocation information in the communications regions, used by the wireless base stations in their communications with the wireless terminal from the wireless control station, is sent to each of the wireless base stations, and each of the signal base stations performs communications with the wireless terminal by using the communications region in the wireless frame corresponding to the allocation information received from the wide-area control station.

11 Claims, 9 Drawing Sheets

FIG. 4(A)

| | BASE STATION #1 | BASE STATION #2 | BASE STATION #3 | ... | BASE STATION #n |
|---|---|---|---|---|---|
| BASE STATION #1 | | INTERFERENCE | NON-INTERFERENCE | ... | INTERFERENCE |
| BASE STATION #2 | INTERFERENCE | | INTERFERENCE | ... | INTERFERENCE |
| BASE STATION #3 | NON-INTERFERENCE | INTERFERENCE | | ... | NON-INTERFERENCE |
| ... | ... | ... | ... | | ... |
| BASE STATION #n | INTERFERENCE | INTERFERENCE | NON-INTERFERENCE | ... | |

FIG. 4(B)

| | BASE STATION #1 | BASE STATION #2 | BASE STATION #3 | ... | BASE STATION #n |
|---|---|---|---|---|---|
| BASE STATION #1 | | INTERFERENCE | NON-INTERFERENCE | ... | NON-INTERFERENCE |
| BASE STATION #2 | INTERFERENCE | | INTERFERENCE | ... | INTERFERENCE |
| BASE STATION #3 | NON-INTERFERENCE | INTERFERENCE | | ... | NON-INTERFERENCE |
| ... | ... | ... | ... | | ... |
| BASE STATION #n | NON-INTERFERENCE | INTERFERENCE | NON-INTERFERENCE | ... | |

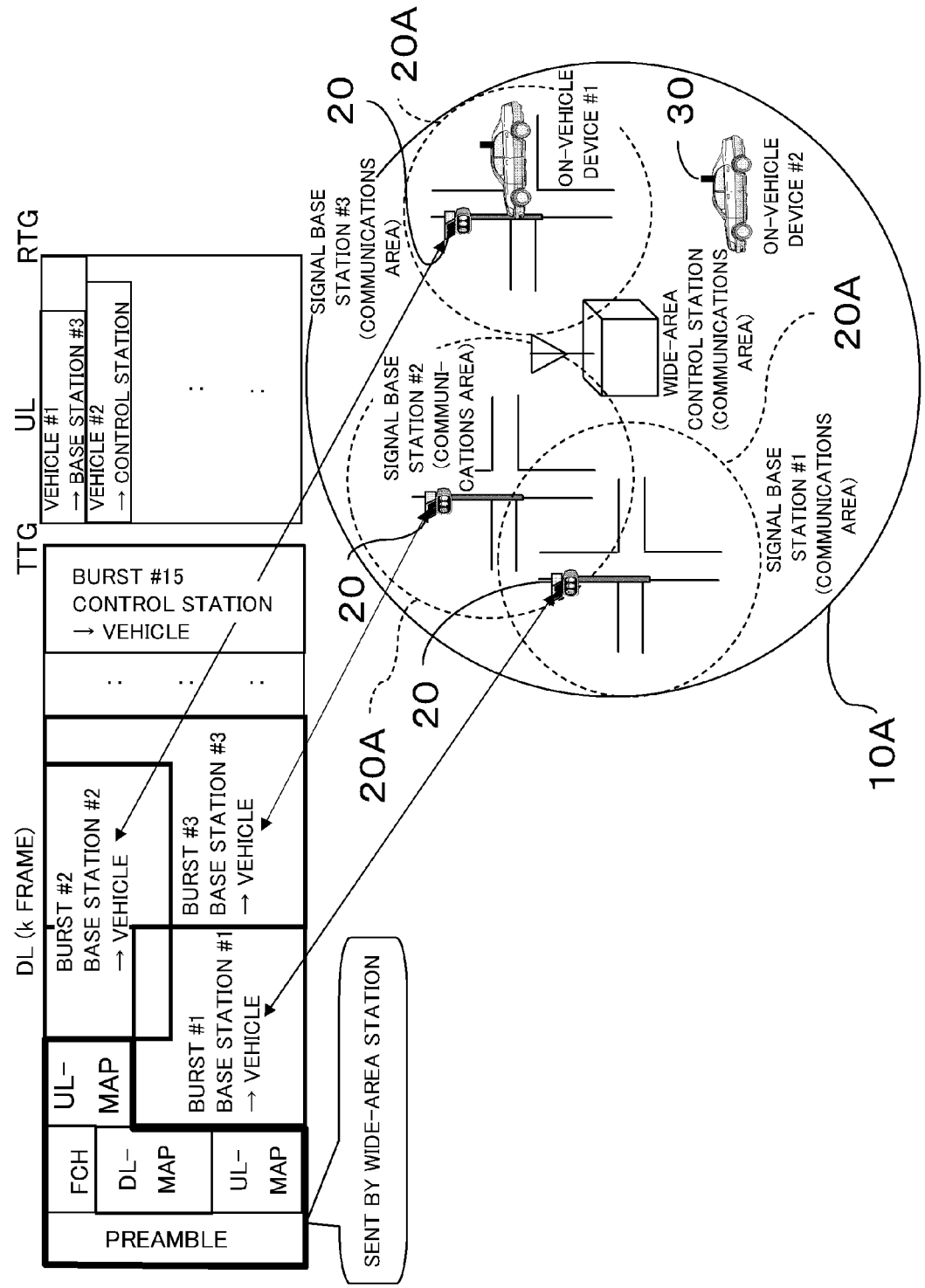

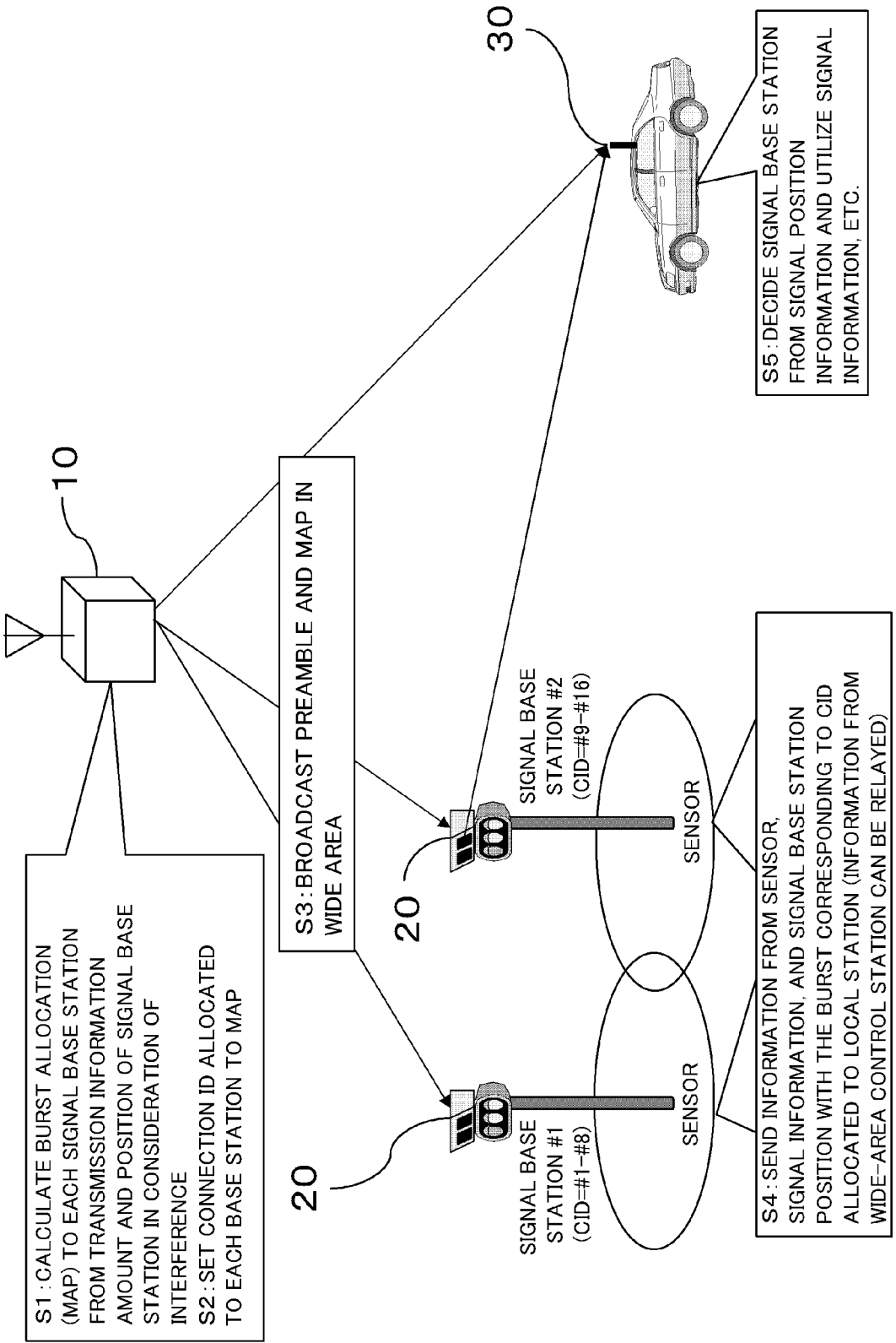

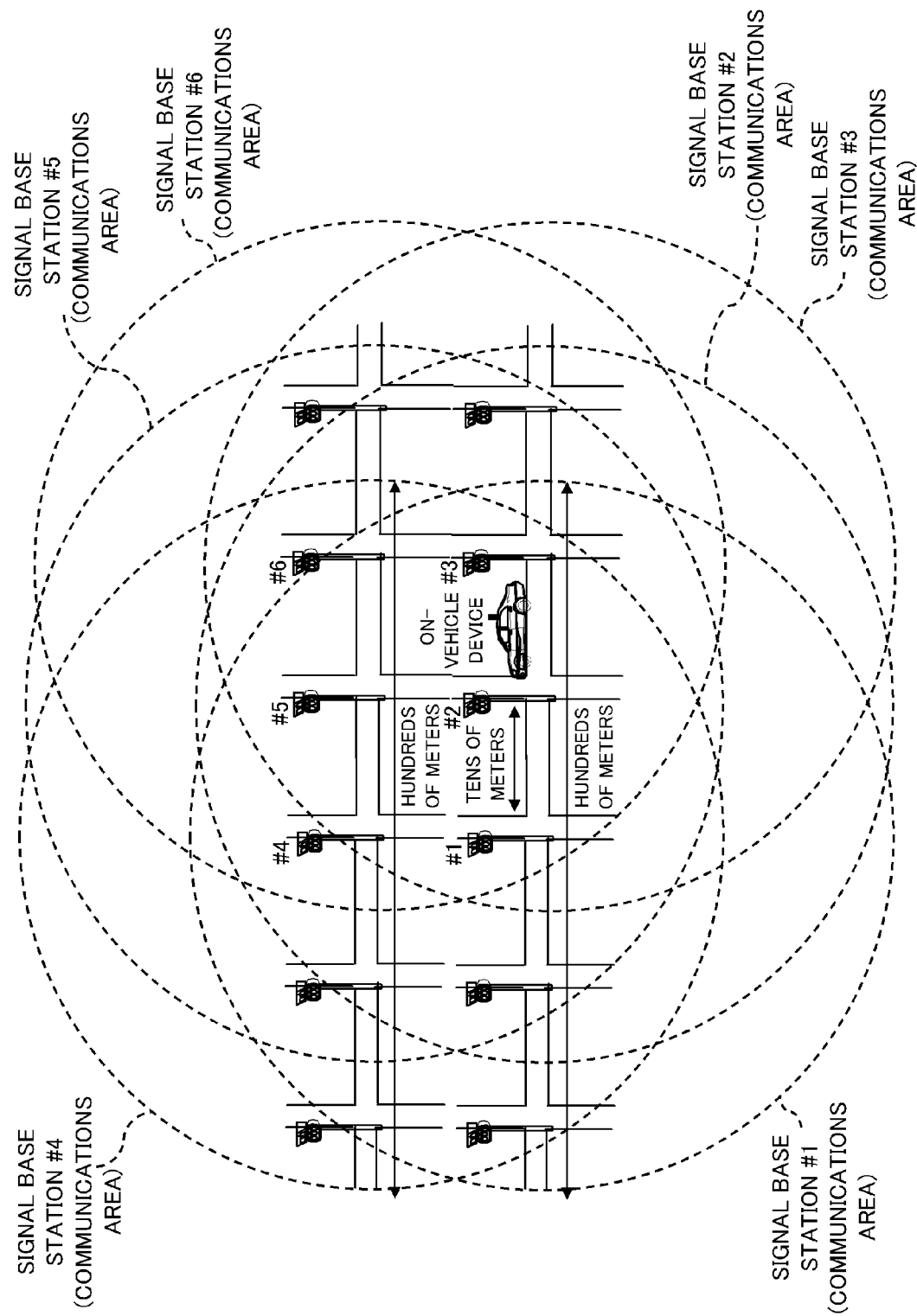

US 8,204,040 B2

WIRELESS COMMUNICATIONS METHOD, WIRELESS CONTROL STATION, AND WIRELESS BASE STATION

CROSS-REFERENCE TO RELATED APPLICATION(S)

This application is a continuation Application of a PCT international application No. PCT/JP2006/325952 filed on Dec. 26, 2006 in Japan, the entire contents of which are incorporated by reference.

TECHNICAL FIELD

The present invention relates to a wireless communications method, a wireless control station, and a wireless base station. The present invention relates to, for example, the technology suitable for use in the ITS (Intelligent Transport System) which performs wireless communications (road-to-vehicle communications) with the OFDMA scheme such as the WiMAX system.

BACKGROUND ART

Recently, for reducing traffic accidents, the ITS (Intelligent Transport System) has been under development. As such an ITS system, there is an embodiment of the road-to-vehicle communications in which the traffic signal is provided with a wireless base station (road side device), and also in which information, such as traffic signal information (the signal light is red or green, or the like) and the presence or the absence of a right-turning vehicle, is set to a terminal (on-vehicle device) provided for an approaching vehicle that is present several meters ahead.

On the other hand, recently, as an intermediate distance large-capacity wireless communications system, standardization and development of a system called WiMAX have been progressed in the IEEE802.16WG (Working Group) by use of the OFDMA (Orthogonal Frequency Domain Multiple Access) scheme in which multiplexing in the frequency axis direction and the time axis direction to the wireless frame is flexibly performed. In this instance, the IEEE802.16WG mainly defines two types of standards, that is, the IEEE802.16d for use in fixed communications (for example, see the following non-patent documents 1 and 2) and the IEEE802.16e for use in mobile communications (for example, see the following non-patent document 2).

The IEEE802.16d and the IEEE802.16e define that a wireless terminal (MS: Mobile Station) realizes communications between the BS and the MS in accordance with the MAP information contained in the wireless frame sent by the wireless base station (BS: Base Station).

FIG. 8 illustrates a wireless frame format in conformity to the IEEE802.16e standard. As depicted in FIG. 8, a wireless frame in conformity to the IEEE802.16e standard is subjected to time-division multiplexing of a downlink (DL) sub-frame in the direction from the MS to the BS and an uplink (UL) sub-frame in the direction from the MS to the BS. In this instance, as to the time axis direction, a TTG (Transmit Transition Gap) is provided between the DL sub-frame and the UL sub-frame; an RTG (Receive Transition Gap) is provided between the wireless frames (between the UL sub-frame and the subsequent wireless frame).

Further, to the DL sub-frame, a preamble, a frame control header (FCH), downlink MAP information (DL-MAP), uplink MAP information (UL-MAP) (hereinafter, these will be also called header information), and one or more downlink bursts (DL bursts), are multiplexed in the two-dimensional domain formed by the time axis (symbol time) direction and the frequency (frequency channel) direction. To the UL sub-frame, one or more uplink bursts (UL bursts) are multiplexed. In this instance, the number of DL bursts is defined to be 15 at maximum. Yet further, information other than the UL bursts is generated by the BS.

Here, the preamble is a field into which frame synchronization information is inserted, and the FCH is a field into which information relating to the MAP such as the size and the position of the MAP is inserted. Further, the MAP information includes information such as the communications connection ID (CID) sent with wireless resources [frequency channel and time (transmission timing)] (this is called "burst") used by the MS in communications, the burst allocation position (burst position) of the burst of the connection in the wireless frame, the size of the burst (burst size), the modulation scheme of the burst (QPSK, 16QAM, 64QAM, or the like), coding ratio, or the like.

That is, the MAP information is regarded as information (burst allocation information) which specifies (allocates) the field (reception field and transmission field) of the wireless frame to be received and sent by the MS. In this instance, the abovementioned burst position can be specified with symbol offset and sub-channel offset from the leading symbol of the wireless frame; the above mentioned burst size can be specified by the number of symbols and the number of sub-channels.

Accordingly, the MS detects the above preamble, thereby establishing downlink and uplink wireless frame synchronization. Further, the MS performs demodulation processing and decoding processing to the DL burst field specified by the DL-MAP defined by the FCH, thereby executing selective reception processing to the DL bust distained to the local MS, while performing data transmission to BS in the UL burst field specified by UL-MAP.

Here, since there is a necessity in the ITS for sending a large amount of data, such as an image data, from a road side device to an on-vehicle device, application of the ITS, as a wireless communications system in which large-amount and flexible multiplexing is available, to road-to-vehicle communications in the WiMAX system based on OFDMA is now under view.

Non-Patent Document 1: IEEE802.16-2004
Non-Patent Document 2: IEEE802.16e-2005 (IEEE 802.16-2004/Cor1-2005)

DISCLOSURE OF THE INVENTION

Issues to be Solved by the Invention

However, in a case where the WiMAX system is applied to the road-to-vehicle communications in the above described ITS, the following issues are encountered.

That is, as to the ITS, there is a demand such that the traffic signal, which is provided with a road side device (signal base station), is capable of notifying an on-vehicle device positioned away (for example, hundreds of meters ahead) from an intersection of the traffic signal information or the like of the traffic signal information of the intersection or the like. However, traffic signals can be positioned at short distance intervals, such as tens of meters, in urban areas or the like. In such a case, if the signal base stations provided for the traffic signals use the same frequency to send different information items, interference is caused (see FIG. 7).

In the WiMAX system, in order to avoid an occurrence of interference among the BSs, it is possible to use a frequency channel (sub-channel) divided into more than one segment. In the wireless frame defined in the above non-patent document 2, for example, it is permitted to use a frequency channel in the form of being divided into three segments at maximum, as depicted in FIG. 9.

Here, in a case where the intervals between the traffic signals are tens of meters, it is required that the radio wave reaches hundreds of meters ahead, so that it is impossible to avoid an occurrence of interference unless the number of segments is equal to or larger than 10. However, in the wireless frame defined in the above non-patent document 2, segments of a number equal to or larger than 4 are not regulated, so that it becomes impossible to avoid an occurrence of interference in a case where the intervals among the traffic signals are tens of meters. Further, in the case of the WiMAX system, the BS performs integrated control to the wireless resources used in its communications with the MS in synchronization therebetween, so that the cost for the control function and the synchronization function becomes high, thereby making the signal base stations expensive.

In view of the above described issues, one of the objects of the present invention is to make it possible to allocate the wireless resources to four or more road side devices (wireless base stations) that are positioned with close intervals thereamong by use of the wireless frame employed in a wide-area and large-amount wireless communications system such as the WiMAX system.

Further, another of the objects of the present invention is to realize the allocation without changing the format of the wireless frame.

Yet further, still another of the objects of the present invention is to realize an inexpensive signal base station.

In this instance, the objects of the present invention should by no means be limited to the above described objects, and a yet further object of the present invention is to accomplish the effects and benefits that can not be obtained by the previous art, which effects and benefits introduced by each of the constructions indicated in the best mode for realizing the invention, which will be described later.

Means to Solve the Issues

In order to accomplish the above objects, the present invention features in that it uses the wireless communications method, the wireless control station, and the wireless base station, which will be described below.

(1) As a generic feature of the wireless communications method according to the present invention, there provided is a wireless communications method for use in a wireless communications system including: a plurality of wireless base stations; a wireless control station; and a wireless terminal, the wireless communications method including: on the wireless control station, sending allocation information of a communications region in a wireless frame used by the each individual wireless base station in communications with the wireless terminal to the wireless base stations and the wireless terminal; and on the each individual wireless base station, performing communications with the wireless terminal by using the communications region of the wireless frame according to the allocation information received from the wireless control station.

(2) As a preferred feature, the communications region is defined by time and frequency.

(3) As another preferred feature, the wireless control station sends the allocation information, which is included in a header portion that is a part of the wireless frame, to the each individual wireless base station, and the wireless control station does not send other communications regions than the header part to the each individual wireless base station.

(4) As yet another preferred feature, the wireless control station holds interference information indicating whether or not interference occurs when the communications regions are overlapped in the wireless frame among the wireless base stations, and the wireless control station generates allocation information, such that the communications regions are not overlapped in the wireless frame, among the wireless base stations with an occurrence of interference thereamong, based on the interference information.

(5) As still another preferred feature, the wireless control station generates allocation information, such that a part or all of the communications regions in the wireless frame are overlapped, among the wireless base stations with no occurrence of interference thereamong, based on the interference information.

(6) As a further preferred feature, the each individual wireless base station holds a connection identifier usable in communications with the wireless terminal, which connection identifier is allocated to the each individual wireless base station, on the wireless control station, holding the connection identifier allocated to the each individual wireless base stations; and sending one of the connection identifiers, which is included in the allocation information, to the each individual wireless base station, and on the each individual wireless base station, receiving allocation information including a connection identifier allocated thereto; and performing communications with the wireless terminal by using the communications region according to the allocation information.

(7) As a yet further preferred feature, the each individual wireless base station sends transmission data including positional information of the each individual wireless base station, which transmission data is sent by using the communications region, to the wireless terminal, and the wireless terminal recognizes a wireless base station which is a sender of the transmission data based on the positional information.

(8) As a still further preferred feature, the wireless control station generates allocation information in the communications region of the size according to the amount of data sent, by the each individual wireless base station, in the communications region.

(9) As yet another preferred feature, the amount of data takes a fixed value in the each individual wireless base station.

(10) As still another preferred feature, the wireless control station obtains information relating to the amount of data from the each individual wireless base station through a backhaul circuit.

(11) As a further preferred feature, the interference information is obtained based on one or more than one combination of distances between the individual wireless base stations, transmission power of the each individual wireless base station, a modulation scheme, and a coding ratio.

(12) As a yet further preferred feature, the wireless base station is provided for a traffic signal in transportation means, and the wireless terminal is provided for a vehicle in the transportation means.

(13) As another generic feature, there provided is a wireless control station for use in a wireless communications system including: a plurality of wireless base stations; a wireless control station; and a wireless terminal, the wireless control station including: an allocation information generating unit which generates allocation information of a communications region in a wireless frame used by the each individual wireless base station in its communications with the wireless terminal; and a transmitting unit which sends the allocation information generated by the allocation information generating unit to the each individual wireless base station and the wireless terminal.

(14) As a preferred feature, the communications region is defined by time and frequency.

(15) As another preferred feature, the wireless control station sends the allocation information, which is included in a header portion that is a part of the wireless frame, to the each individual wireless base station, and the wireless control station does not send other communications regions than the header part to the each individual wireless base station.

(16) As yet another preferred feature, the wireless control station, further including an interference information holding unit which hold interference information indicating whether or not interference occurs when the communications regions are overlapped in the wireless frame among the wireless base stations, and the allocation information generating unit generates allocation information, such that the communications regions are not overlapped in the wireless frame, among the wireless base stations with an occurrence of interference thereamong, based on the interference information held in the interference information holding means.

(17) As still another preferred feature, the allocation information generating unit generates allocation information, such that a part or all of the communications regions in the wireless frame are overlapped, among the wireless base stations with no occurrence of interference thereamong, based on the interference information.

(18) As a further preferred feature, the wireless control station further comprises: a connection identifier holding unit which holds connection identifiers allocated to the individual wireless base stations, and the allocation information generating unit generates the allocation information which includes the connection identifier.

(19) As a yet further preferred feature, the allocation information generating unit generates allocation information in the communications region of the size according to the amount of data sent, by the each individual wireless base station, in the communications region.

(20) As a still further preferred feature, the amount of data takes a fixed value in the each individual wireless base station.

(21) As yet another preferred feature, the wireless control station further comprises: a data amount information obtaining unit which obtains information relating to the amount of data from the each individual wireless base station through a backhaul circuit.

(22) As still another preferred feature, the interference information is obtained based on one or more than one combination of distances between the individual wireless base stations, transmission power of the each individual wireless base station, a modulation scheme, and a coding ratio.

(23) As yet another generic feature, there provided is a wireless base station for use in a wireless communications system including: a plurality of wireless base stations; a wireless control station; and a wireless terminal, the wireless base station including: an allocation information receiving unit which receives allocation information in a communications region in a wireless frame used in communications with the wireless terminal from the wireless control station; and a communications unit which performs communications with the wireless terminal by using the communications region in the wireless frame according to the allocation information received by the allocation information receiving unit.

(24) As a preferred feature, the wireless base station further comprises: a connection identifier holding unit which holds connection identifiers usable in communications with the wireless terminal, which connection identifier is allocated to the each individual wireless base station; the allocation information receiving unit receives the allocation information including the connection identifier allocated thereto, and the communications unit performs communications with the wireless terminal by using the communications region according to the allocation information.

(25) As another preferred feature, the communications unit sends transmission data including positional information of the wireless base station itself, which transmission data is sent by using the communications region, to the wireless terminal.

Effects of the Invention

According to each of the modes of the present invention, at least any one of the following effects and benefits are obtained.

(1) Since the wireless control station performs integral controlling of allocation of the communications region (wireless resources) used by each wireless base station in its communications with the wireless terminal, it becomes possible to offer, for example, road and traffic information or the like, including the traffic signal information, to wireless terminals that are present in a wide range while avoiding radio wave interference among the wireless base stations.

(2) Since the necessity for providing the wireless base station with the allocation controlling function of communications regions is eliminated, it become possible to reduce the processing ability and cost required in the wireless base station.

(3) Since it is not necessary to add any change to the wireless frame format in conformity to the IEEE802.16e, if every one of the wireless control station, the wireless base station, and the wireless terminal can support the wireless communications function under the IEEE802.16e standard, the present invention is capable of being realized easily.

(4) Since it is possible for the wireless control station to send the allocation information which is included in the header field, which is a part of the wireless frame other than the communications regions in the wireless frame, it becomes possible to simplify the functions required in the wireless control station.

(5) Partly since it is possible for the wireless control station to hold and manage interference information as to whether or not interference occurs in a case where the communications regions are overlapped in the wireless frame among the wireless base stations, and partly since it is possible for the wireless control station to allocate the communications regions so as to be overlapped in the same wireless frame, it become possible to improve the frequency use efficiency.

(6) Here, the interference information depends on the intervals among the wireless base stations, the transmission power of each wireless base station, the modulation scheme, the coding ratio, or the like. However, since the wireless control station is capable of controlling allocation of the bursts based on such differences, it is possible for the wireless control station to perform more flexible and detailed allocation control.

(7) Partly since each wireless base station holds and manages the connection identifiers (CIDs) allocated thereto, which connection identifiers can be used in communications with the wireless terminal, and partly since the wireless control station holds and manages the above mentioned CIDs in each wireless base station, it is possible for each wireless base station to identify the allocation information that includes the CID allocated to itself, and to appropriately receive the allocation information. This makes it possible for each wireless base station to appropriately perform communications in the communications region specified by the allocation information.

(8) Since the wireless base station, which sends the positional information thereof in the form such that the positional information is contained in the transmission data (communications region), makes it possible for the wireless terminal to decide from which one of the wireless base stations the received data if sent, based on the received positional information, it becomes also possible for the wireless terminal to uniquely recognize the traffic signal information of each of the wireless base stations, the peripheral road condition, or the like.

(9) Partly since the wireless control station is capable of performing burst allocation of a fixed size for each wireless base station, taking the data amount sent by each of the wireless base stations as a fixed value, and partly since the wireless control station is capable of obtaining information relating to the data amount sent by each of the wireless base station by way of a backhaul circuit or the like and also allocating the burst according to the data amount for each of the wireless base stations, it is possible for the wireless control station also to flexibly allocate the burst of a necessary size for each of the wireless base stations.

BRIEF DESCRIPTION OF THE DRAWINGS

[FIG. 4(A)] and [FIG. 4(B)] each are examples of an inter-signal base station interference information table managed by the non-interference station control unit of the wide-area control station depicted in FIG. 2;

[FIG. 5] is a diagram for describing MAP information allocation performed by the wide-area control station depicted in FIG. 2;

[FIG. 6] is a diagram for describing an operation of the ITS depicted in FIG. 1;

[FIG. 7] is a diagram for describing the issues relating to the previous art;

DESCRIPTION OF REFERENCE CHARACTERS

Figure 1:
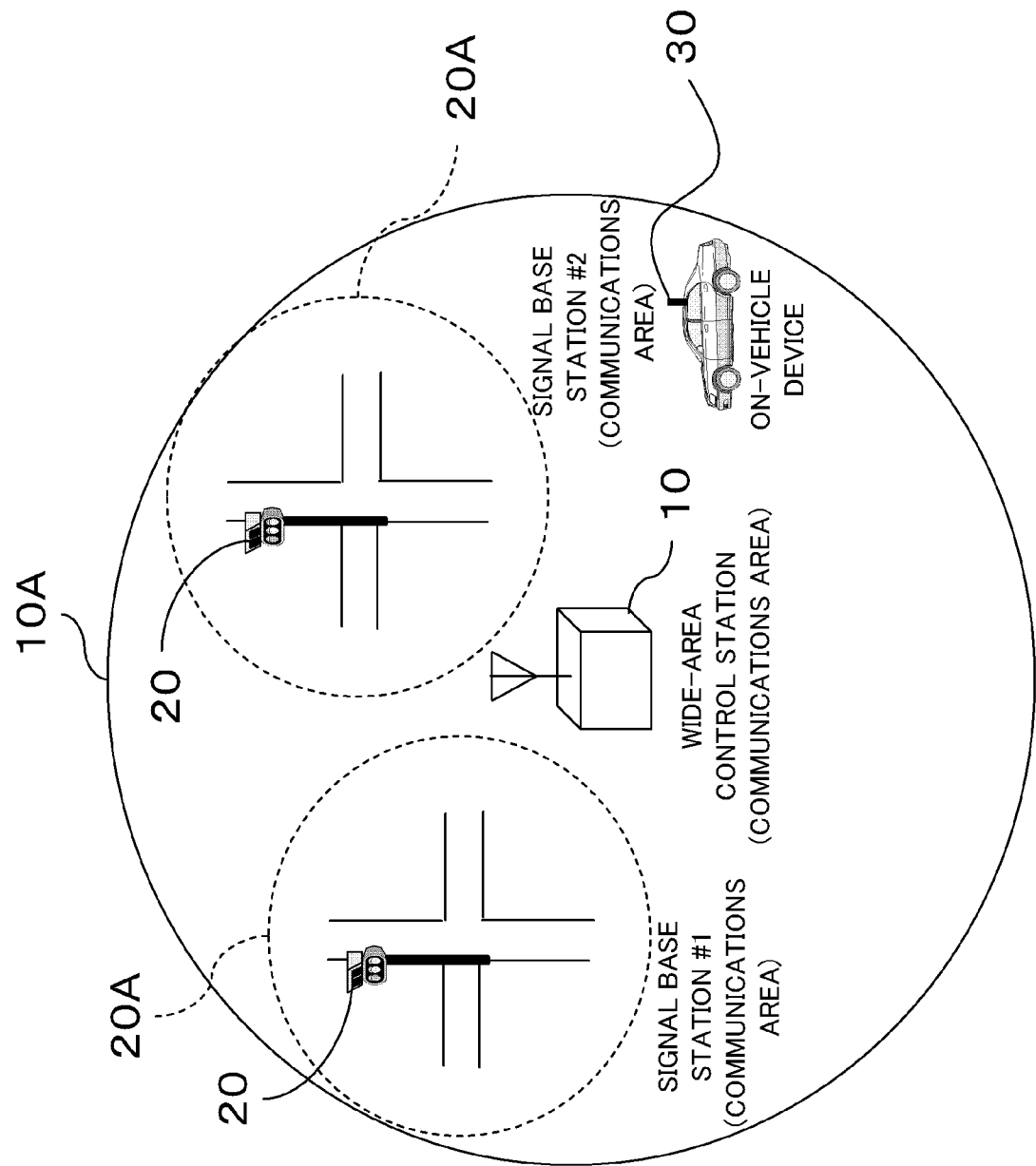
[FIG. 1] is a diagram illustrating a construction of an ITS as a wireless communications system according to one embodiment of the present invention.

| | |
|---|---|
| 10 . . . | wide-area control station (wireless control station) |
| 10A . . . | wireless communications area |
| 101 . . . | MAP information generating unit |
| 102 . . . | transmitting unit |
| 103 . . . | antenna sharing unit (duplexer) |
| 104 . . . | transceiver antenna |
| 105 . . . | CID managing unit |
| 106 . . . | non-interference station managing unit |
| 107 . . . | MAPinformation (wirelessresources) allocation controlling unit |
| 108 . . . | receiving unit |
| 20 . . . | signal base station (wireless base station) |

-continued

DESCRIPTION OF REFERENCE CHARACTERS

| | |
|---|---|
| 20A . . . | wireless communications area |
| 201 . . . | signal data generating unit |
| 202 . . . | transmitting unit |
| 203 . . . | antenna sharing unit (duplexer) |
| 204 . . . | transceiver antenna |
| 205 . . . | CID managing unit |
| 206 . . . | receiving unit |
| 207 . . . | MAP information analyzing unit |
| 208 . . . | burst allocation controlling unit |
| 30 . . . | wireless terminal (on-vehicle device) |

BEST MODE FOR CARRYING OUT THE INVENTION

An embodiment of the present invention will now be described with reference to the relevant accompanying drawings. Here, the present invention should by no means be limited to the above-illustrated embodiment, and various changes or modifications may be suggested without departing from the gist of the invention.

(One Embodiment)

FIG. 1 is a diagram illustrating a construction of an ITS as a wireless communications system according to one embodiment of the present invention. The system illustrated in FIG. 1 includes signal base stations (wireless base stations) 20 and a wide-area control station (wireless control station) 10 forming a wireless communications area 10A that can cover wireless communications areas 20A each formed by each individual signal base station 20, and is also capable of providing a wireless terminal 30 (hereinafter will be called "on-vehicle device 30") with wireless communications with signal light information (currently red or green, or the like) of a traffic signal having the signal base station 20 and/or information relating to traffic conditions in the vicinity of the traffic signal.

Figure 8:
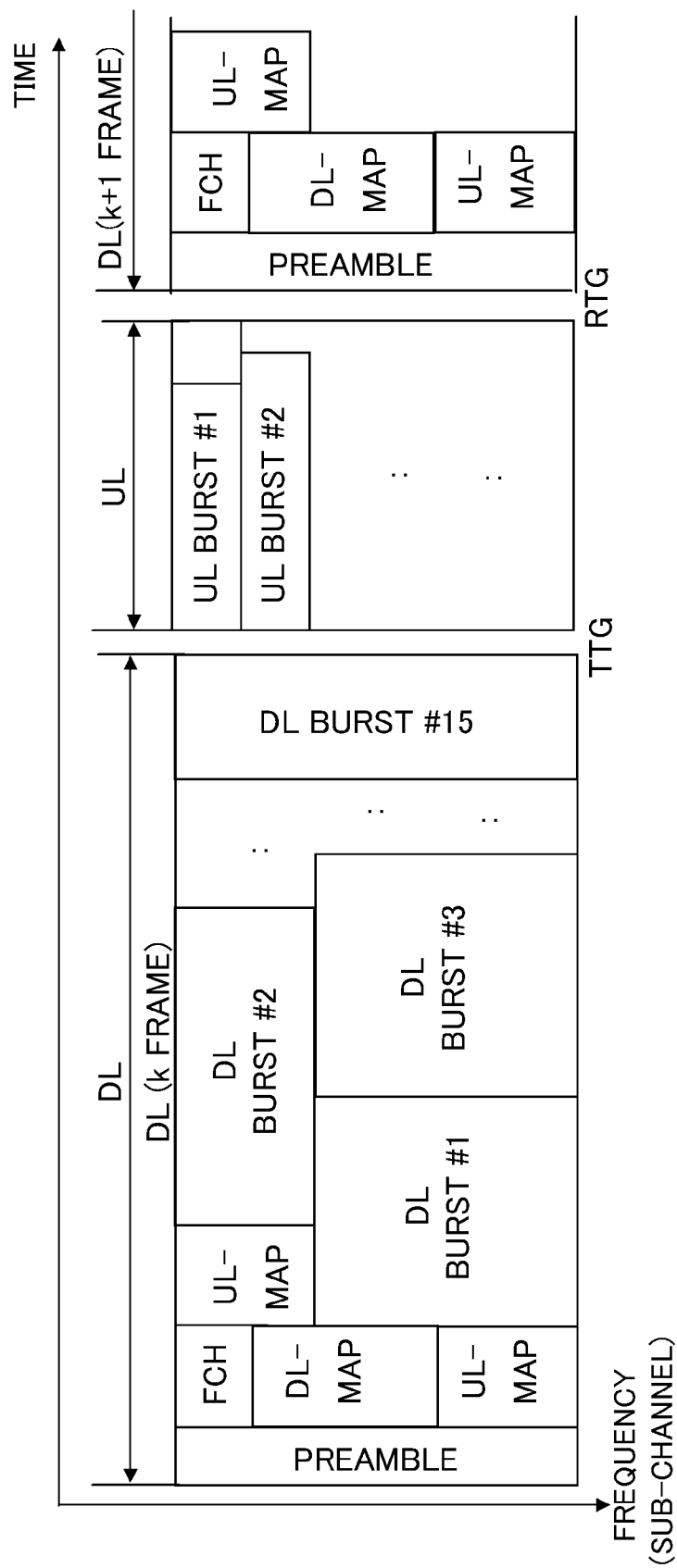
[FIG. 8] is a diagram illustrating a wireless frame format in conformity to the IEEE802.16e standard.
Figure 9:
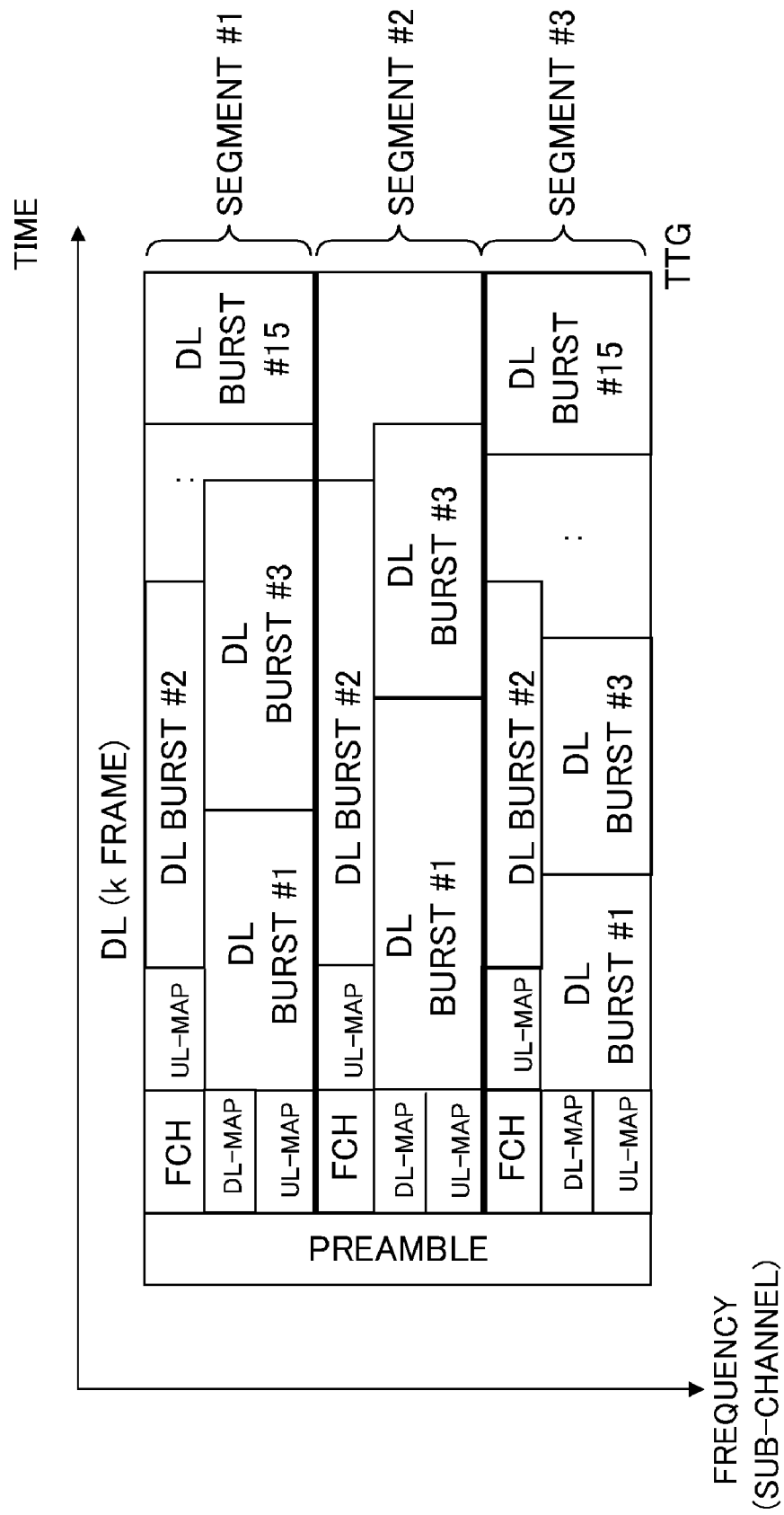
[FIG. 9] is a diagram illustrating an example in which the wireless frame format depicted in FIG. 8 is divided into segments.

In this instance, the wireless frame used in the present wireless communications is predicated on the wireless frame in conformity with the IEEE802.16e standard already described with reference to FIG. 8. Here, as will be described below, such a case can be considered as that in which no UL sub-frame burst, no DL burst from the wide-area control station 10 to the wireless terminal 30, or no DL burst from the wide-area control station 10 to the signal base stations 20, is present. In addition, such a case can be also considered as that in which the DL burst from the wide-area control station 10 to the signal base stations 20 is relayed to the wireless terminal 30 by the signal base stations 20.

Further, the information relating to traffic conditions includes, for example, the state of congestion (heavy traffic), the presence or the absence of an emergency vehicle, the presence or the absence of road repairing, the road surface condition (road surface temperature, pavement condition, the presence or the absence of rainfall, snow coverage, or freezing) or the like (hereinafter, will be collectively called "road and traffic information") The road and traffic information further includes at least one of the textual information, voice/sound information, still image, and moving image.

(Wide-Area Control Station 10)

Figure 2:
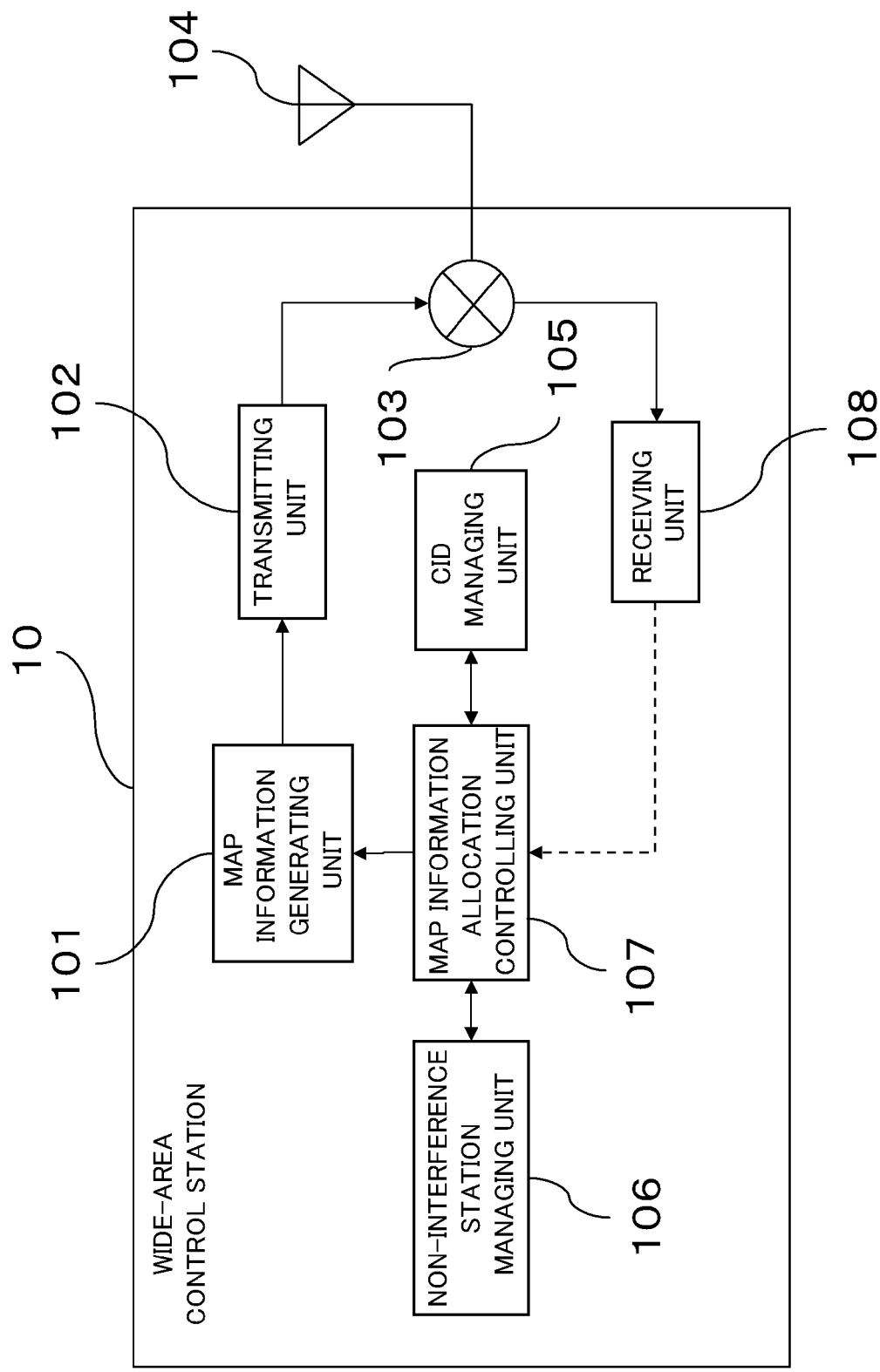
[FIG. 2] is a diagram illustrating a construction of an important part of a wide-area control station depicted in FIG. 1.

FIG. 2 is a diagram illustrating an example of a construction of a wide-area control station 10. With an attention paid to its important part, the wide-area control station 10 depicted in FIG. 10[sic] includes, for example: a MAP information generating unit 101; a transmitting unit 102; an antenna sharing unit (duplexer) 103; a transceiver antenna 104; a CID managing unit 105; a non-interference station managing unit 106; a MAP information allocation controlling unit 107; and a receiving unit 108.

Here, the MAP information generating unit (allocation information generating unit) 101 generates MAP information (burst allocation information) to be sent as DL-MAP and UL-MAP in the above-mentioned wireless frame, that is, allocation information of wireless resources (communications region defined by time and frequency in a wireless frame) used by each signal base station 20 in its communications with the wireless terminal 30. In this example, the MAP information generating unit 101 is capable of generating MAP information which realizes allocation (arrangement) in such a manner that no interference occurs among the signal base stations 20 in burst allocation in the wireless frame used by each signal base station 20 in communications (at least downlink communications connection to the on-vehicle device) in obedience to allocation control from the MAP information allocation controlling unit 107, which will be described later.

The transmitting unit 102 performs wireless transmission of the MAP information (DL-MAP, UL-MAP) generated by the MAP information generating unit 101, as a part (information element) of other portions other than the burst field of the wireless frame, together with each of the information items, a preamble and an FCH. The transmitting unit 102 is capable of performing necessary wireless processing including: error correction coding such as convolution coding and turbo coding; modulation (symbol mapping to the sub-channel) such as QPSK, 16QAM, and 64QAM; DA conversion; frequency conversion (up conversion) from a baseband frequency to a wireless frequency; and amplification by a high-power amplifier (not illustrated). In this instance, according to the present example, the transmitting unit 102 sends only the header information without performing burst transmission subsequent thereto [a burst (that is, road and traffic information) is generated by each signal base station 20].

The duplexer 103, which is provided to separate a transmission signal and a reception signal, outputs a transmission signal from the transmitting unit 102 to the transceiver antenna (hereinafter, will be also simply called "antenna") 104, and also outputs a received signal from the antenna 104 to the receiving unit 108.

The CID managing unit 105 is provided to allocate (hold) and manage CIDs that can be used by the individual signal base stations 20, which are under control of the wide-area control station 10 in its communications with the on-vehicle device 30. The CIDs are allocated in such a manner that they are not redundant between the signal base stations 20, based on system construction information (topology information) or the like. This means that the CIDs are used as identifiers of the signal base stations 20, respectively.

For example, assuming that CIDs=#1 through #8 are allocated to the signal base station #1 and that CIDs=#9 through #16 are allocated to the signal base station #2, the allocated CIDs are stored in a memory (not illustrated) as data in the form of a table or the like for each of the signal base stations 20. In this instance, such CIDs are generated by the MAP information generating unit 101 and then sent to each signal base station 20 as an information element included in the MAP information sent to each signal base station 20.

TABLE 1

Example of CID Table

| Signal Base Station | CID |
|---|---|
| #1 | #1 through #8 |
| #2 | #9 through #16 |
| ... | ... |
| #n | ... |

The non-interference station managing unit (interference information holding unit) 106 holds and manages information (inter-signal base station interference information), as to whether or not occurs interference at a level high enough to effect communications in a redundant portion in which a part or all of the allocated bursts are overlapped in the wireless frame between any ones of the signal base stations 20 (here, an occurrence of interference at a level high enough to effect communications is described using a phrase of "interference occurs"). That is, the matter as to whether or not interference occurs between signal the base stations 20 depends upon a distance between the signal base stations 20, the transmission power of the signal base stations 20, the modulation scheme, the coding ratio, or the like. Therefore, on the basis of the information relating to these, the non-interference station managing unit 106 holds and manages the following information: between which signal base stations 20 interference occurs; between which signal base stations 20 no interference occurs.

In more details, as indicated in FIG. 4(A) and FIG. 4(B), for example, as to the n-number of signal base station #1 through #n, information about "interference" and "non-interference" among the signal base stations 20 is stored in a memory or the like (not illustrated) as data in the form of a table. In this instance, FIG. 4(A) indicates inter-signal base station interference information in a case where the transmission power of each signal base station 20 is 10 dBm, and the modulation scheme is 16QAM, and the coding ratio is 1/2; FIG. 4(B) indicates inter-signal base station interference information in a case where the conditions of the transmission power and the coding ratio are the same as the above but the modulation scheme is different (QPSK).

That is, the following are indicated. No interference occurs at the time of low-velocity communications with QPSK among the signal base stations #1 through #n. However, interference occurs at the time of high-velocity communications with 16QAM (see the shaded portion). Further, among the signal base stations #1 through #3 or among the signal base stations #3 through #n, no interference occurs regardless of the dissimilarity of QPSK and 16QAM. Among the other signal base stations 20, interference occurs regardless of the dissimilarity of QPSK and 16QAM.

In this instance, the above described interference information is not always necessary to take all of the distances among the signal base stations 20, the transmission power of the signal base stations 20, the modulation schemes, and the coding ratios, into account. The interference information is capable of being obtained based on one or more than one combination of those, so that it is possible to obtain the interference information more easily as the amount of information which is taken into account is smaller.

On the basis of the inter-signal base station interference information (hereinafter, will be also called simply "interference information") managed in the non-interference station managing unit 106 and the CID for each signal base station 20 managed in the CID managing unit 105, the MAP information (wireless resources) allocation controlling unit 107 controls the MAP information generating unit 101 in such a manner that allocation of the burst (position and size) in the wireless frame identified by the CID for each signal base station 20 is generated by the MAP information generating unit 101.

FIG. 5 illustrates an example of burst allocation performed by the wide-area control station 10 (MAP information allocation controlling unit 107). FIG. 5 is on the assumption that, as to the three signal base stations #1 through #3 under control of the wide-area control station 10, interference occurs among the signal base stations #1 through #3, and no interference occurs between the signal base stations #1 and #2, nor between the signal base station #2 and #3. In this case, the MAP information allocation controlling unit 107 performs MAP information generating control in such a manner that the burst #1 used by the signal base station #1 in its communications with the on-vehicle device 30 and the burst #3 used by the signal base station #3 in its communications with the on-vehicle device 30 are allocated to different symbol time (which can be different sub-channels) so as to prevent those bursts #1 and #3 from becoming redundant. As to the burst field used by the signal base station #2 in communications with the on-vehicle device 30, the MAP information allocation controlling unit 107 performs MAP information generating control in such a manner that at least a part of the burst field is redundantly allocated to the bursts #1 and #3.

That is, as to the MAP information corresponding to each of the signal base stations #1 through #3, information is generated which at least includes: one of the CIDs (=#1 through #8) allocated to each of the signal base stations #1 through #3; a start point (symbol offset, frequency offset) in the wireless frame of the burst #1; and the burst size. In this instance, the burst #15 of FIG. 5 indicates the DL burst used by the wide-area control station 10 in direct communications with the wireless terminal 30. That is, the on-vehicle device 30 is capable of receiving road and traffic information directly from the wide-area control station 10 if the on-vehicle device 30 stays in the wireless communications area of the wide-area control station 10.

As described above, in the wide-area control station 10, the signal base stations 20 which do not interfere with one another are managed. The wide-area control station 10 generates and sends MAP information such that the allocation (allocation of wireless resource in the DL direction) of a part or all of the DL bursts [symbol time and frequency channel (sub-channel)] to the signal base stations 20 which do not interfere with one another are redundant. This makes it possible for these signal base stations 20 to use the same DL burst in their communications with the on-vehicle device 30. In this instance, the allocated burst size can take a fixed value in each of the signal base stations 20 or can take a variable value according to the data amount transmitted to the on-vehicle device 30 for each signal base station.

The receiving unit 108 performs required reception processing including: amplification by a low-noise amplifier (not illustrated); frequency conversion from a wireless frequency into a baseband frequency; linear amplification by an automatic gain control amplifier; orthogonal wave detection; AD conversion; band limitation; demodulation; decoding; or the like to the signal received through the antenna 104 and then input by way of the duplexer 103. The signals subjected to reception processing performed by this receiving unit 108 can be not only the UL sub-frames from the on-vehicle device 30 but also information relating to the transmission data amount of each signal base station 20. The information relating to the transmission data amount can be transmitted from each signal base station 20 through a backhaul circuit or the like. In these cases, the MAP information allocation controlling unit 107 is also capable of controlling the burst size allocated to each signal base station 20 in accordance with information relating to the transmission data amount.

(Signal Base Station 20)

Figure 3:
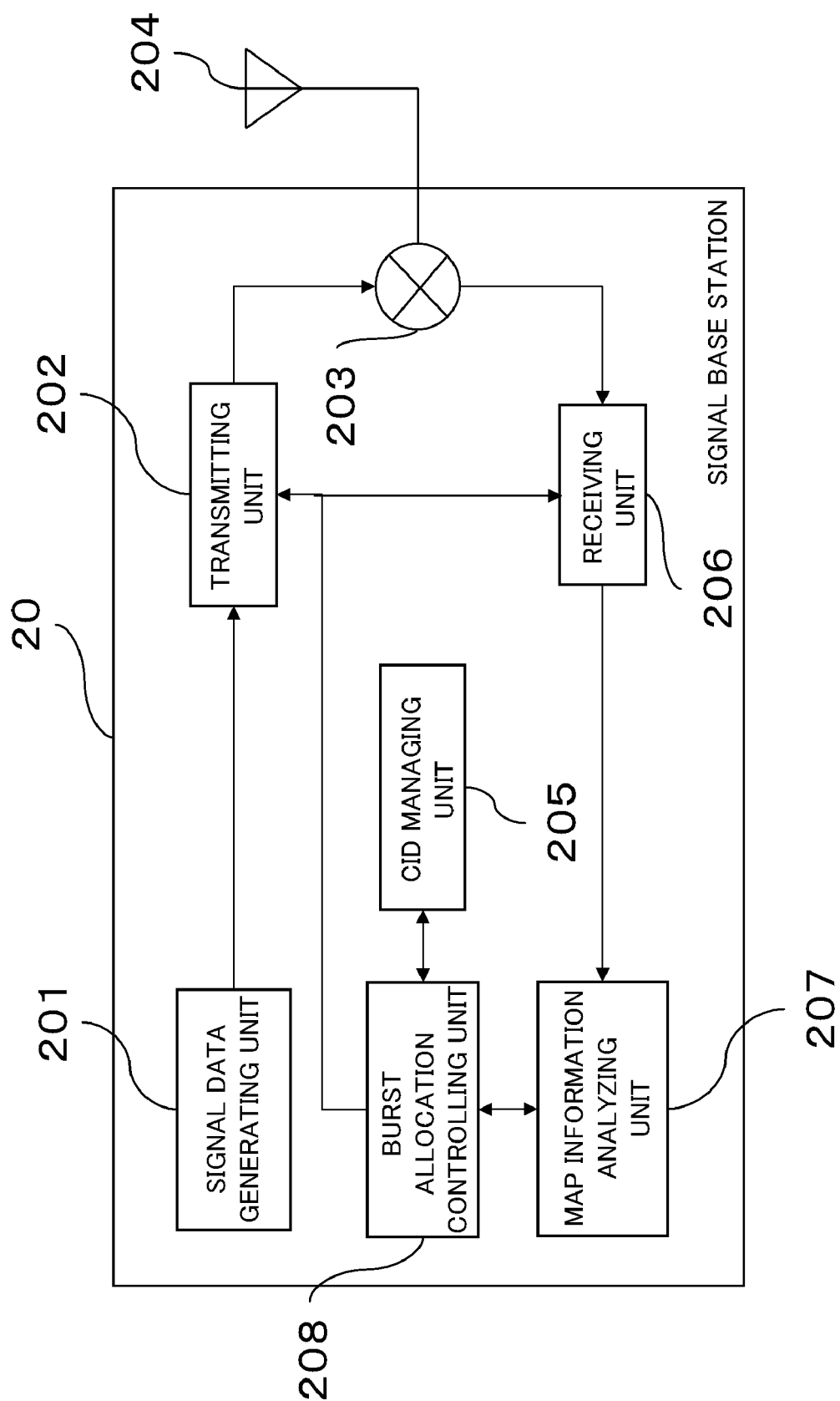
[FIG. 3] is a diagram illustrating a construction of an important part of a signal base station depicted in FIG. 1.

FIG. 3 illustrates a construction of a signal base station 20. With an attention paid to the function of its important part, the signal base station 20 depicted in FIG. 3 includes, for example: a signal data generating unit 201; a transmitting unit 202; an antenna sharing device (duplexer) 203; a transceiver antenna 204; a CID managing unit 205; a receiving unit 206; a MAP information analyzing unit 207; a burst allocation controlling unit 208.

Here, the signal data generating unit 201 generates data to be sent to the wireless terminal 30 with a DL burst, that is, road and traffic information. In addition, the signal data generating unit 201 is also capable of generating the positional information of the signal base station 20 (positional information of its own) and sending the generated positional information to the wireless terminal 30 in the form of being included in the DL burst together with the road and traffic information. This positional information can be used to identify from which one of the signal base stations 20 the DL burst received by the on-vehicle device 30 has been sent. In this instance, the positional information, for example, is capable of being obtained by GPS; the road and traffic information is capable of being obtained by the sensors of various kinds and camera devices provided for the traffic signal.

The transmitting unit 202 wirelessly sends the road and traffic information, generated by the signal data generating unit 201, toward the on-vehicle device 30 with the DL burst specified by the burst allocation controlling unit 208, which will be described later. The transmitting unit 202 is capable of performing required wireless processing to the road and traffic information, which wireless processing includes error correction coding with the scheme specified by DL-MAP, modulation (symbol mapping to a sub-channel), DA conversion, frequency conversion (up conversion) from a baseband signal to a wireless signal, and amplification with a high-power amplifier (not illustrated). In this instance, the header information received from the wide-area control station 10 may or may not be sent (relayed) from the transmitting unit 202 toward the on-vehicle device 30. In a case where the relaying is performed, it is possible to improve reception characteristics by means of diversity combining, performed on the on-vehicle device 30 end, of the signals received from both the wide-area control station 10 and the signal base stations 20.

The duplexer 203, which is provided to separate a transmission signal and a reception signal, outputs a transmission signal from the transmitting unit 202 to the transceiver antenna (hereinafter, will be simply called "antenna") 204, and also outputs the signal received through the transceiver antenna 204 to the receiving unit 206.

The CID managing unit 205 manages the connection IDs to be sent by the local signal base station 20, and the wide-area control station 10 allocates the IDs as indicated in the above table 1, and stores the managed CIDs (usable CIDs) in a memory or the like (not illustrated). That is, for example, in the case of the signal base station #1, CIDs=#1 through #8 are held; in the case of the signal base station #2, CIDs=#9 through #16 are held. Accordingly, if the CID contained in the received MAP information (DL-MAP) is a one that is managed (registered) in the CID managing unit 205, each of the signal base stations 20 is capable of deciding that the local signal base station 20 itself is to receive the burst specified by the MAP information. In this instance, in a case where communications (road-to-vehicle communications) between the signal base station 20 and the on-vehicle device 30 is performed in the form of multicasting/broadcasting, it is possible to use the multicast connection IDs defined by the IEEE802.16e standard.

The receiving unit 206 performs required reception processing, including: amplification by a low-noise amplifier (not illustrated); frequency conversion from a wireless frequency into a baseband frequency; linear amplification by an automatic gain control amplifier; orthogonal wave detection; AD conversion; band limitation; demodulation; decoding; or the like, to the signal (UL sub-frame) received through the antenna 204 and then input thereto by way of the duplexer 203. The receiving unit 206 performs a function as an allocation information receiving unit which receives the MAP information generated by the wide-area control station 10.

The MAP information analyzing unit 207 has the following functions: analyzing the MAP information (DL-MAP) in the signal (DL sub-frame) subjected to the reception processing performed by the duplexer 203; and detecting the burst arrangement position and the burst size of the CID contained in the MAP information. In a case where this MAP information analyzing unit 207 detects any of the CIDs registered in the CID managing unit 205, the burst allocation controlling unit 208 is provided to control the transmitting unit 202 and the receiving unit 206 to perform communications (transceiving) with the on-vehicle device 30 with the burst specified by the burst arrangement position contained in the MAP information and the burst size. With an attention paid to a DL, the burst allocation controlling unit 208 controls the transmitting unit 202 in such a manner that the transmission data (road and traffic information) generated by the signal data generating unit 201 is sent to the on-vehicle device 30.

That is, the above described transmitting unit 202 and receiving unit 206 function as a communications unit which performs communications with the on-vehicle device 30 in the burst (communications region) in the wireless frame according to the MAP information from the wide-area control station 10, which MAP information is received by the receiving unit 206.

(Operation of ITS)

Hereinafter, referring to FIG. 6 together, a description will be made of an operation of the ITS according to the present embodiment with the above described construction.

In the wide-area control station 10, first of all, the MAP information allocation controlling unit 107 calculates burst allocation information (MAP information) to each signal base station 20 based on management information such as the CIDs managed in the CID managing unit 105, interference information managed in the non-interference station managing unit 106, the transmission data amount in the signal base station 20, the positional information of the signal base station 20, or the like (step S1), and then makes the MAP information generating unit 101 to generate MAP information to which the CIDs allocated to the corresponding signal base stations 20 are set to the subject MAP information (step S2). At that time, the MAP information generating unit 101 generates also other header information (preamble, FCH).

That is, on the basis of the above mentioned management information, the wide-area control station 10 generates MAP information in such a manner that the bursts are not redundant in the wireless frame, including (corresponding to) the CID allocated to each of the signal base stations 20 among which interference occurs. On the other hand, among the signal base stations 20 with no occurrence of interference thereamong, in a case where no empty space in the bursts is present, the wide-area control station 10 generates MAP information, including the CID allocated to each of the signal base stations 20, in which a part or all of the bursts are redundant.

Then, the MAP information, as information element of header information, is sent (broadcasted) to the wireless communications area 10A of the wide-area control station 10 from the antenna 104 by way of the transmitting unit 102 and the duplexer 103 (step S3).

On the other hand, each of the signal base stations 20 detects the preamble of the wireless frame to be sent by the wide-area control station 10, thereby establishing synchronization of the DLs and receiving the whole of the MAP information sent from the wide-area control station 10. That is, upon receiving a signal from the wide-area control station 10 through the transceiver antenna 204, the signal base station 20 establishes DL synchronization with respect to the received signal by way of the receiving unit 206, and then decodes the received signal, and eventually transmits the decoded signal to the MAP information analyzing unit 207. The MAP information analyzing unit 207 detects MAP information from the decoding result of the received signal, and then analyzes the contents of the MPA information.

As a result of the analysis, if a CID (in the case of the signal base station #1, any one of the CIDs=#1 through #8; in the case of the signal base station #2, any one of the CIDs=#9 through #16) registered in the CID managing unit 205 is set to the received MAP information, the burst position and the burst size contained in the CID and/or the MAP information, the burst position and the burst size contained in the CID or/and the MAP information are transmitted to the burst allocation controlling unit 208. The burst allocation controlling unit 208 then controls the transmitting unit 202 in such a manner that the DL data (traffic signal information, road and traffic information, and the positional information of the signal base stations 20) generated by the signal data generating unit 201 is sent with the burst corresponding to the CID in accordance with such transmission information.

With this arrangement, the DL data, as an information element of the DL sub-frame of the wireless frame, is sent from the transmitting unit 202 to the wireless communications area 20A of the local signal base station 20 itself by way of the duplexer 203 and the transceiver antenna 204 with the burst specified (allocated) by the wide-area control station 10 (step S4).

Here, at that time, it is also possible to relay the header information (MAP information) received from the wide-area control station 10 to the wireless communications area 20A together. Further, the wide-area control station 10 secures a burst for transmission of the data generated by the local wide-area control station 10 itself (for example, the burst #15 of FIG. 5), and it is also possible for the signal base station 20 which has received the data to relay the subject data by utilizing, for example, a part of the burst allocated to the local signal base station 20 itself.

As described above, the on-vehicle device 30 receives the wireless frame (DL sub-frame) in conformity with the IEEE802.16e standard, and decides the position of a traffic signal (signal base station 20) based on the positional information contained in the burst of the received DL sub-frame, and utilizes the DL data (traffic signal information, road and traffic information, or the like) received with the burst, by means of, for example, displaying such information on the screen of an on-vehicle display (step S5).

As described above, according to the present embodiment, since the wide-area control station 10 integratedly performs allocation control of the burst (wireless resources) used in communications among the signal base stations 20 and the on-vehicle device 30, it is possible to offer road and traffic information containing traffic signal information to the on-vehicle device 30 over a wide area, avoiding radio wave interference among the signal base stations 20 in the ITS. Further, since the necessity for providing an allocation control function of the wireless resources (MAP information) for the individual signal base stations 20 is eliminated, it becomes possible to reduce the required processing ability and the cost of the signal base stations 20.

Further, according to the present example, since there is no necessity for adding any changes to a wireless frame format in conformity to the IEEE802.16e standard, every one of the wide-area control station 10, the signal base stations 20, and the on-vehicle device 30 can be realized easily if a wireless communications function of the IEEE802.16e standard is capable of being supported.

For example, the allocation control of the wireless resources (MAP information) performed by the wide-area control station 10 is merely processing of allocating wireless resources according to the required band domain, and the above allocation control is the same as or the similar to the BS processing of the general WiMAX, so that it is easy to use the function therein. On the other hand, the on-vehicle device 30 only need to extract the positional information of the signal base station 20 as data in a layer upper than the WiMAX layer, so that changing of the function not higher than that of the WiMAX layer is unnecessary.

Further, the wide-area control station 10 merely need to send (broadcast) only the header information containing at least the MAP information of the wireless frame at the time of allocation controlling performed, so that the required functions in the wide-area control station 10 need to be simplified in its required functions if transmission of the data generated by the wide-area control station 10 itself is not necessary to be sent from the wide-area control station 10 itself.

Yet further, at the time of the above described allocation controlling, in the wide-area control station 10, the non-interference station managing unit 106 holds and manages interference information as to whether or not interference occurs in a case where the bursts among the signal base stations 20 are overlapped. In the signal base station 20 in which no interference occurs, the MAP information allocation controlling unit 107 is capable of redundantly allocating the bursts in the same wireless frame, so that it is possible to improve the frequency use efficiency. In particular, although the interference information differs depending upon the distance between the signal base stations 20, the transmission power, the modulation scheme, the coding ratio, or the like, of each of the signal base stations 20, the signal base station 20 should only be capable of controlling such burst allocation based on such differences, which makes it possible to execute more flexible and detailed allocation control.

Still further, since each signal base station 20 holds and manages the CID allocated there to and the wide-area control station 10 holds and manage the CID in the form of being included in the MAP information and then sends the MAP information including the CID, it is possible for each of the signal base stations 20 to appropriately identify the MAP information containing the CID allocated to the signal base stations 20 itself, so that it is also possible for each of the signal base stations 20 to perform communications appropriately with the burst specified by the MAP information.

Furthermore, the signal base station 20 sends the positional information of its own, in the form of being contained in the transmission data (burst), thereby making it possible for the on-vehicle device 30 to evaluate which one of the signal base stations 20 the data is sent from. As a result, it becomes possible for the on-vehicle device 30 to uniquely recognize the traffic signal information of each of the signal base stations 20 and the road condition in its peripheral areas.

Further, since it is possible for the wide-area control station 10 to perform the burst allocation of a fixed size for each transmission data amount of each of the signal base stations 20, and also, since it is possible for the wide-area control station 10 to obtain the information relating to the transmission data amount of each of the signal base stations 20 from the each individual signal base stations 20 through the backhaul circuit or the like, and since it is also possible to allocate a burst of the size according to the transmission data amount for each of the signal base stations 20, allocation of the burst of a necessary size for each of the signal base stations 20 is capable of being performed, so that it is resultantly possible to flexibly allocate the burst of the necessary size therefor, thereby making it possible to flexibly allocate the burst of the necessary size therefor.

Accordingly, the burst of a larger size is allocated to each of the signal base station 20 arranged at the position, for example, the well-trafficked intersection, an alternative path associated with the road repairing, and the road with rash of accidents, where alot of information is to be provided, or otherwise, as to the other signal base station 20, it is possible to allocate a burst of a smaller size thereto. Further, it is also possible to dynamically change the burst size to be allocated, in accordance with the time band and the traffic amount.

In this instance, the above described embodiment is on the assumption that the ITS of each of the signal base stations 20 is provided for each of the traffic signals arranged along the roads, and also that the on-vehicle device 30 is an ITS provided for a vehicle on the road, but the positions at which the signal base stations 20 and the on-vehicle device 30 are provided can be changed appropriately. For example, in a case where a railway network is assumed to be one of the traffic means, it is possible to provide each signal base station 20 for each of the traffic signals arranged at a railroad crossing gate, and the wireless terminal 30 is provided for a railway car, so that it becomes possible to realize the service which offers each of the signal base stations 20 with information relating to the information about each of the railway crossing gates and also to arrange the wireless terminal 30 in the railway network.

INDUSTRIAL APPLICABILITY

As already describe in detail above, the present invention makes it possible to offer road and traffic information or the like, including traffic signal information, while avoiding radio wave interference among the wireless base stations, to wireless terminals present in a wide area. Therefore, the present invention is considered to be significantly useful in the field of the wireless communications technology.

The invention claimed is:

1. A wireless communications method for use in a wireless communications system that includes a plurality of wireless base stations, a wireless control station and a wireless terminal, the wireless communications method comprising:
   on the wireless control station,
   sending, directly to each of the wireless base stations and the wireless terminal, allocation information about a communication region in a wireless frame used by each of the wireless base stations to communicate with the wireless terminal; and
   on each of the wireless base stations, communicating with the wireless terminal by using the communication region in the wireless frame according to the allocation information received directly from the wireless control station,
wherein the wireless control station holds interference information indicating whether or not interference occurs when the communication regions are overlapped in the wireless frame among the wireless base stations,
wherein the wireless control station generates allocation information, such that the communication regions are not overlapped in the wireless frame, among the wireless base stations with an occurrence of interference thereamong, based on the interference information, and
wherein the wireless control station generates allocation information, such that a part or all of the communication regions in the wireless frame are overlapped, among the wireless base stations with no occurrence of interference thereamong, based on the interference information.

2. A wireless communications method for use in a wireless communications system that includes a plurality of wireless base stations, a wireless control station and a wireless terminal, the wireless communications method comprising:
on the wireless control station,
sending, directly to each of the wireless base stations and the wireless terminal, allocation information about a communication region in a wireless frame used by each of the wireless base stations to communicate with the wireless terminal; and
on each of the wireless base stations,
communicating with the wireless terminal by using the communication region in the wireless frame according to the allocation information received directly from the wireless control station, wherein each of the wireless base stations holds a connection identifier usable in a communication with the wireless terminal, which connection identifier is allocated to each of the wireless base stations,
on the wireless control station,
holding the connection identifier allocated to each of the wireless base stations; and
sending one of the connection identifiers, which is included in the allocation information, to each of the wireless base stations, and
on each of the wireless base stations,
receiving allocation information including a connection identifier allocated thereto; and
communicating with the wireless terminal by using the communication region according to the allocation information.

3. A wireless communications method for use in a wireless communications system that includes a plurality of wireless base stations, a wireless control station and a wireless terminal, the wireless communications method comprising:
on the wireless control station,
sending, directly to each of the wireless base stations and the wireless terminal, allocation information about a communication region in a wireless frame used by each of the wireless base stations to communicate with the wireless terminal; and
on each of the wireless base stations,
communicating with the wireless terminal by using the communication region in the wireless frame according to the allocation information received directly from the wireless control station; and
sending transmission data including positional information of each of the wireless base stations, which transmission data is sent by using the communication region, to the wireless terminal,
on the wireless terminal,
recognizing, based on the positional information, a wireless base station which is a sender of the transmission data.

4. A wireless communications method for use in a wireless communications system that includes a plurality of wireless base stations, a wireless control station and a wireless terminal, the wireless communications method comprising:
on the wireless control station,
sending, directly to each of the wireless base stations and the wireless terminal, allocation information about a communication region in a wireless frame used by each of the wireless base stations to communicate with the wireless terminal; and
on each of the wireless base stations,
communicating with the wireless terminal by using the communication region in the wireless frame according to the allocation information received directly from the wireless control station; and
generating allocation information about the communication region of the size according to the amount of data sent by each of the wireless base stations, in the communication region, wherein the amount of data takes a fixed value in each of the wireless base stations.

5. A wireless communications method for use in a wireless communications system that includes a plurality of wireless base stations, a wireless control station and a wireless terminal, the wireless communications method comprising:
on the wireless control station,
sending, directly to each of the wireless base stations and the wireless terminal, allocation information about a communication region in a wireless frame used by each of the wireless base stations to communicate with the wireless terminal; and
on each of the wireless base stations,
communicating with the wireless terminal by using the communication region in the wireless frame according to the allocation information received directly from the wireless control station,
wherein the wireless control station holds interference information indicating whether or not interference occurs when the communication regions are overlapped in the wireless frame among the wireless base stations,
wherein the wireless control station generates allocation information, such that the communication regions are not overlapped in the wireless frame, among the wireless base stations with an occurrence of interference thereamong, based on the interference information, and
wherein the interference information is obtained based on one or more than one combination of distances between the wireless base stations, transmission power of each of the wireless base stations, a modulation scheme, and a coding ratio.

6. A wireless control station for use in a wireless communications system that includes a plurality of wireless base stations, the wireless control station and a wireless terminal, the wireless control station comprising:
a generator that generates allocation information about a communication region in a wireless frame used by each of the wireless base stations to communicate with the wireless terminal;

a transmitter that sends, directly to each of the wireless base stations and the wireless terminal, the allocation information generated by the generator; and an interference information holding unit that holds interference information indicating whether or not interference occurs when the communication regions are overlapped in the wireless frame among the wireless base stations, wherein the generator generates allocation information, such that the communication regions are not overlapped in the wireless frame, among the wireless base stations with an occurrence of interference thereamong, based on the interference information held in the interference information holding unit, wherein the generator generates allocation information, such that a part or all of the communication regions in the wireless frame are overlapped, among the wireless base stations with no occurrence of interference thereamong, based on the interference information.

7. A wireless control station for use in a wireless communications system that includes a plurality of wireless base stations, the wireless control station and a wireless terminal, the wireless control station comprising:

a generator that generates allocation information about a communication region in a wireless frame used by each of the wireless base stations to communicate with the wireless terminal;

a transmitter that sends, directly to each of the wireless base stations and the wireless terminal, the allocation information generated by the generator; and a connection identifier holding unit that holds connection identifiers allocated to each of the wireless base stations, wherein the generator generates the allocation information which includes the connection identifier.

8. A wireless control station for use in a wireless communications system that includes a plurality of wireless base stations, the wireless control station and a wireless terminal, the wireless control station comprising:

a generator that generates allocation information about a communication region in a wireless frame used by each of the wireless base stations to communicate with the wireless terminal; and a transmitter that sends, directly to each of the wireless base stations and the wireless terminal, the allocation information generated by the generator, wherein the generator generates allocation information in the communication region of the size according to the amount of data sent, by each of the wireless base stations, in the communication region, and wherein the amount of data takes a fixed value in each of the wireless base stations.

9. A wireless control station for use in a wireless communications system that includes a plurality of wireless base stations, the wireless control station and a wireless terminal, the wireless control station comprising:

a generator that generates allocation information about a communication region in a wireless frame used by each of the wireless base stations to communicate with the wireless terminal;

a transmitter that sends, directly to each of the wireless base stations and the wireless terminal, the allocation information generated by the generator; and an interference information holding unit that holds interference information indicating whether or not interference occurs when the communication regions are overlapped in the wireless frame among the wireless base stations, wherein the generator generates allocation information, such that the communication regions are not overlapped in the wireless frame, among the wireless base stations with an occurrence of interference thereamong, based on the interference information held in the interference information holding unit, wherein the interference information is obtained based on one or more than one combination of distances between the wireless base stations, transmission power of each of the wireless base stations, a modulation scheme, and a coding ratio.

10. A wireless base station for use in a wireless communications system that includes a plurality of wireless base stations, a wireless control station and a wireless terminal, the wireless base station comprising:

a receiver that receives allocation information about a communication region in a wireless frame used to communicate with the wireless terminal, the allocation information being sent directly to each of the wireless base stations and the wireless terminal from the wireless control station;

a communication interface that communicates with the wireless terminal by using the communication region in the wireless frame according to the allocation information received by the receiver; and a connection identifier holding unit that holds connection identifiers usable in a communication with the wireless terminal, which connection identifier is allocated to each of the wireless base stations, wherein the receiver receives the allocation information including the connection identifier allocated thereto, and wherein the communication interface communicates with the wireless terminal by using the communication region according to the allocation information.

11. A wireless base station for use in a wireless communications system that includes a plurality of wireless base stations, a wireless control station and a wireless terminal, the wireless base station comprising:

a receiver that receives allocation information about a communication region in a wireless frame used to communicate with the wireless terminal, the allocation information being sent directly to each of the wireless base stations and the wireless terminal from the wireless control station; and a communication interface that communicates with the wireless terminal by using the communication region in the wireless frame according to the allocation information received by the receiver, wherein the communication interface sends transmission data including positional information of the wireless base station itself, which transmission data is sent by using the communication region, to the wireless terminal.

* * * * *